(12) United States Patent
Chaen et al.

(10) Patent No.: US 6,576,281 B1
(45) Date of Patent: *Jun. 10, 2003

(54) METHOD FOR INHIBITING TRIMETHYLAMINE FORMATION

(75) Inventors: Hiroto Chaen, Okayama (JP); Kazuyuki Oku, Hiroshima (JP); Toshio Miyake, Okayama (JP)

(73) Assignee: Kabushiki Kaisha Hayashibara Seibutsu Kagaku Kenkyujo, Okayama (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/213,893

(22) Filed: Dec. 17, 1998

(30) Foreign Application Priority Data

Dec. 26, 1997 (JP) .............................. 9-366677
Feb. 23, 1998 (JP) ........................... 10-055710
Dec. 11, 1998 (JP) ........................... 10-352900

(51) Int. Cl.$^7$ .............................. A23B 7/08; A23B 7/10
(52) U.S. Cl. ...................... 426/321; 426/335; 426/534; 426/643; 426/658
(58) Field of Search ................................ 426/321, 335, 426/534, 643, 658

(56) References Cited

U.S. PATENT DOCUMENTS 4,910,039 A    3/1990   Fujita et al.

FOREIGN PATENT DOCUMENTS

| | | |
|---|---|---|
| EP | 0809939 | 12/1997 |
| EP | 0813820 | 12/1997 |
| JP | 07-170977 | 7/1995 |
| JP | 07-289206 | 7/1995 |
| JP | 07-213283 | 8/1995 |
| JP | 08-073482 | 3/1996 |

OTHER PUBLICATIONS

"Method for food analysis", ed. Food Analysis in Japanese Society for Food Science and Technology, Japan, pp. 674–676 (1982).
XP–002100482, (1985).
Patent Abstracts of Japan, JP 08–308484, (1996).
Patent Abstracts of Japan, JP 07–079745, (1995).
Patent Abstracts of Japan, JP 07–227243, (1995).
Patent Abstracts of Japan, JP 08–009931, (1996).
Patent Abstracts of Japan, JP 63–116673, (1988).

*Primary Examiner*—Helen Pratt
(74) *Attorney, Agent, or Firm*—Browdy and Neimark PLLC

(57) ABSTRACT

Disclosed are a method for inhibiting trimethylamine formation per se from raw fishery products by incorporating trehalose and/or maltitol, an agent having trehalose and/or maltitol as effective ingredients to inhibit trimethylamine formation per se from raw fishery products, and an edible fishery product with satisfactory flavor and taste obtained by using the method or the agent.

6 Claims, No Drawings

METHOD FOR INHIBITING TRIMETHYLAMINE FORMATION

BACKGROUND OF THE INVENTION

1. Field of the Invention

The present invention relates to a method for inhibiting trimethylamine formation, and more particularly to a method for inhibiting trimethylamine formation comprising a step of incorporating trehalose and/or maltitol into a product to be treated, an edible fishery product which trimethylamine formation is inhibited by the method, a trimethylamine formation inhibitory agent comprising trehalose and/or maltitol as effective ingredients, and uses thereof.

2. Description of the Prior Art

It is known that sound or fresh fishery products scarcely smell but they develop a bad smell due to the formation of trimethylamine, a volatile compound as a main causative of a characteristic unpleasant fish smell, formed easily when losing freshness or treated with processings of drying, grilling, boiling, etc. As a method to reduce such unpleasant smell, there has long been used a method for cooking fishery products using spices such as capsicum, pepper, wasabi (Japanese horseradish), Japanese pepper, garlic, and ginger. Such method, however, is not one of lowering the formation of trimethylamine per se as a main causative of fish smell, but one for masking unpleasant smell only by adding a strongly-stimulative taste or flavor. Thus, the know method has a drawback that it may even change a satisfactory flavor, taste, or color inherent to fishery products.

For the last few years, there has been used a method for masking smell using the enclosing action by cyclodextrins. This method, however, has the following drawbacks: Once-enclosed substances as causative of fish smell are easily replaced with other substances, that are susceptive to receive the enclosing action, to release unpleasant smell; and the masking effect of unpleasant smell is not satisfactory. Japanese Patent Kokai No. 289,206/95 discloses a method for removing unpleasant raw smell of extracts of fishery products such as stocks produced in their cooking and broths produced in their steaming, which method comprises adding and dissolving saccharides to and in the extracts, and heating the resulting mixtures at a relatively-high temperature of 125° C. or 130° C. to remove the unpleasant raw smell of the extracts. In this publication it is shown that such method has a drawback in that it easily imparts a scorched smell to the extracts because the method needs an excessively-high temperature treatment. Thus, the prior art techniques are limited as to how to mask or remove the once-formed unpleasant fish smell and have an insufficient effect with many accompanying drawbacks.

SUMMARY OF THE INVENTION

In view of the conventional drawbacks of prior arts, the present invention was made based on a completely novel technical conception, and the objects according to the present invention are to provide a method for inhibiting the formation of unpleasant fish smell per se, an edible fishery product wherein trimethylamine formation is inhibited by the above method, and a novel trimethylamine formation inhibitory agent, as well as its uses.

To overcome the above objects, the present inventors continued studying on the use of saccharides; they studied the influence of saccharides on their inhibitory effect on trimethylamine formation from trimethylamine oxide in the presence of saccharides and trimethylamine oxide as a precursor of trimethylamine. As a result they found that, as compared with other saccharides, trehalose and/or maltitol unexpectedly exert a strong inhibitory effect on the formation of trimethylamine per se, and they confirmed that the formation is strongly inhibited similarly as above by incorporating trehalose and/or maltitol into edible parts of fishery products. Thus they accomplished this invention. The present invention was made based on a technical conception that it fundamentally inhibits trimethylamine formation through the study of trimethylamine formation per se that is deemed as a main causative of the unpleasant fish smell. The technical concept has never been known, so the present technical object is novel in itself. The present invention, which comprises a step of inhibiting the formation of trimethylamine per se by incorporating trehalose and/or maltitol into products to be treated, is novel because no disclosure and no indication about the present invention is found in the prior art. In other words, all the objects and constructions of the present invention are novel, and the effect is also novel and outstanding.

DETAILED DESCRIPTION OF THE INVENTION

The first object of the present invention is to provide a method for inhibiting trimethylamine formation, which is characterized in that it comprises a step of incorporating trehalose and/or maltitol into products to be treated; the second object is to provide an edible fishery product which trimethylamine formation is inhibited by preserving and/or processing raw fresh fishery products in the presence of trehalose and/or maltitol; and the third object is to provide a trimethylamine formation inhibitory agent comprising trehalose and/or maltitol as effective ingredients and uses thereof. Any trehalose and/or maltitol can be used in the present invention independently of their origin and property as long as they inhibit the formation of trimethylamine. The trehalose usable in the present invention includes, for example, those in the form of a syrup, hydrous crystal, and anhydrous crystal, which are produced by the methods as disclosed in Japanese Patent Kokai Nos. 170,977/95 and 213,283/95, can be arbitrarily used. In particular, "TREHAOSE®", a high-purity hydrous crystalline trehalose commercialized by Hayashibara Shoji, Inc., Okayama, Japan, can be advantageously used. The maltitol usable in the present invention includes, for example, those in the form of a syrup and an anhydrous crystal which are produced by the methods as disclosed in Japanese Patent Kokoku Nos. 13,699/72 and 2,439/88, can be arbitrarily used. In particular, "MABIT®", a crystalline maltitol anhydride commercialized by Hayashibara Shoji, Inc., Okayama, Japan, can be advantageously used. Mixtures obtained by mixing commercially available trehalose and maltitol in a free proportion and those obtained by hydrogenating trehalose and maltose as disclosed in Japanese Patent Kokai No. 73,482/96 can be arbitrarily used as mixtures of trehalose and maltitol. The trehalose and/or maltitol usable in the present invention should not be those with a relatively-high purity, and if necessary they can be used in combination with one or more another saccharides listed below as long as the other saccharides do not hinder the trimethylamine formation inhibitory effect; reducing sugars such as glucose, maltose, maltotriose, and maltotetraose; non-reducing saccharides such as sorbitol, maltotritol, and maltotetraitol; and cyclodextrins and their related compounds such as α-, β- and γ-cyclodextrins and derivatives thereof.

To effectively increase the trimethylamine formation inhibitory effect, acids can be arbitrarily used in combination with trehalose and/or maltitol to adjust edible parts of fishery products to neutral or acid pHs, preferably, pHs of around 5 to around 7, and more preferably, pHs of around 6 to around 7. Examples of the acids, conventional organic acids such as acetic acid, lactic acid, citric acid, tartaric acid, malic acid, and gluconic acid can be preferably used, and if necessary inorganic acids can be also used. If need be, one or more of the aforesaid spices; flavor-enhancers of amino acids and nucleic acids; liquors including sakes, sweet sakes, brandies, and alcohols; water-soluble polysaccharides such as pectin, alginic acid, and pullulan; and inorganic salts such as salt, potassium chloride, magnesium chloride, and phosphates can be used to exert a satisfactory masking effect.

The edible fishery products according to the present invention mean edible products consisting of or comprising edible parts of fishery products, and compositions comprising edible parts of fishery products, all of which should exert a satisfactory inhibitory effect on the formation of trimethylamine from edible parts of raw fishery products. Preferably, the trehalose and/or maltitol can be homogeneously incorporated into products to be treated in an amount of at least about 0.1 w/w % (the wording "w/w %" is abbreviated as "%", hereinafter) of the trehalose and/or maltitol in total, more preferably at least about 0.2% but less than 30%, and most preferably at least of about 0.5% but less than 20%. Usually, the trehalose and/or maltitol could not exert a sufficient trimethylamine formation-inhibitory effect when used in an amount of less than 0.1%, and they tend to excessively sweeten edible products when used in an amount of at least 30%. However, they can be even used in such an amount of 30% or higher when used in products such as foods of delicate flavor, snack foods, and confectionery-type foods, which are rather preferably be sweetened. The content of trehalose and/or maltitol can be arbitrarily increased as much as possible to process up to the desired products in which trehalose hydrate and/or maltitol anhydride are crystallized, and having a lesser hygroscopicity and a satisfactory stability.

The wording "incorporating" as referred to in the present invention means "coexisting by contacting", i.e., in the case of incorporating trehalose and/or maltitol into edible parts of fishery products, any means can be used in the present invention as long as it exerts an inhibitory effect on the formation of trimethylamine from edible parts of fishery products independently of the methods used for incorporation. Preferably, it can be favorable to incorporate trehalose and/or maltitol into edible parts of raw fishery products by contacting the saccharide(s) with the edible parts in aqueous media as homogeneously as possible. For example, when the edible parts of raw fishery products are in a juicy form such as in a liquid or paste form, either trehalose and/or maltitol in the form of a powder, crystal, or solid can be incorporated into the edible parts by dissolving to homogeneity as much as possible under mixing conditions, or trehalose and/or maltitol in the form of a syrup can be also incorporated into the edible parts by mixing to homogeneity as much as possible.

When the edible parts of raw fishery products used in the present invention are in a solid form, they are first treated with water to give a watery form such as in a liquid or paste form, then treated similarly as above to incorporate trehalose and/or maltitol; or the edible parts in a solid form are incorporated with trehalose and/or maltitol in a manner such that the saccharides are prepared into a syrup, then the edible parts are dispersed, dissolved, or suspended in the syrup to contact with the saccharides as homogeneously as possible. When the edible parts of fishery products are those of their edible tissues in an intact form or a minced form, they are sprayed and mixed with trehalose and/or maltitol in a powdery or crystalline form to dissolve and incorporate the saccharides, or they are soaked in a syrupy product containing trehalose and/or maltitol to incorporate the saccharide(s) as homogeneously as possible.

The wording "edible parts of fishery products" as referred to in the present invention means proteinaceous edible parts from aquatic animals including, for example, fishes such as bluefin tunas, swordfishes, skipjack tunas, yellowtails, Japanese Spanish mackerels, saithes, flatfishes, olive flounders, barracudas, croakers, blue drums, sea breams, sharks, conger eels, eels, puffers, Japanese shads, sardines, horse mackerels, chub mackerels, flathead grey mullets, Pacific herrings, Japanese capelines, chum salmons, and masu salmons; shellfishes such as Japanese fresh water clams, short-necked clams, Japanese hard clams, oysters, scallops, Japanese cockles, bloody clams, whelks, Thomas's rapa whelks, horned turbans, and abalones; crustaceans such as shrimps, crabs, and giant clams; molluscans such as octopuses and squids; and echinoderms such as sea urchins and sea cucumbers. The edible parts of these fishery products are, for example, tissues and organs of the fishery products such as meats, visceras, spawns, bloods, bones, and skins; and derivatives thereof obtained, for example, by mincing and grinding.

According to the present invention, raw edible parts of the above fishery products are directly or after minced or ground incorporated with trehalose and/or maltitol, and the resulting products can be in usual manner treated with one or more processings such as drying, soaking, grilling, boiling, steaming, and frying to produce the desired edible fishery products in which the trimethylamine formation is effectively inhibited. It was found that fillets of raw fish meats and spawns of salmon-, herring-, and salted Alaska pollack-roes are contacted with trehalose and/or maltitol for preservation, for example, under freezing or cooling conditions at preferable temperatures of 5° C. or lower, whereby naturally-occurring trimethylamine formation is strongly inhibited, resulting in a freshness being kept for a relatively-long period of time. The edible fishery products, in which the trimethylamine formation is inhibited by incorporating trehalose and/or maltitol, include, for example, stockfishes such as opened and dried barracudas and horse mackerels, dried mirin-seasoned Pacific sauries and puffers, squids dried overnight, and dried cuttlefishes; boiled and dried fishes such as fine wrinkles, dried sea slugs for broth, and dried shrimps; vinegar-seasoned Japanese shads, small sea breams, and chub mackerels; products pickled with salt such as Japanese Spanish mackerels and sea breams preserved in miso, shrimps preserved in koji, salted opossum shrimps, salted squids, slightly salted salmons, and sea breams steamed with salt; fish jelly products such as boiled fish pastes, chikuwas (a kind of fish paste), Japanese deep-fat fried foods, fish meat sausages, and fish meat hams; foods of delicate flavors such as cleaved and dried Japanese common squids, mirin-seasoned puffers, and dried products of steamed shellfishes; foods boiled down in soy such as small fishes, shellfishes, and Japanese common squids; and canned and bottled products such as edible parts of fishes, shellfishes, crustaceans, and mollusks, all of which are boiled in water, as well as canned and bottled edible products. According to the present invention, a desired trimethylamine formation inhibitory effect is attained and a variety of appetite-stimulating cooked foods can be obtained by using trehalose and/or maltitol when cooking daily dishes such as boiled foods, roasted foods, steamed foods, and fried foods, as well as foods served in pots such as soups, boiled fishes, boiled vegetables, and Japanese hotchpotches.

The present invention is arbitrarily used to inhibit trimethylamine formation by incorporating the present trimethylamine formation inhibitory agent containing trehalose and/or maltitol as effective ingredients into edible parts of raw fishery products. The content of trehalose and/or maltitol as effective ingredients for the trimethylamine formation inhibitory agent is an amount that exerts a desired inhibitory effect on the formation of trimethylamine form edible parts of raw fishery products; Usually, it is at least about 10%, preferably at least about 20%, and more preferably at least about 50% to the agent, on a dry solid basis (d.s.b.). The trimethylamine formation inhibitory agent according to the present invention can be arbitrarily prepared into those which consist of trehalose and/or maltitol, and if necessary one or more another substances selected from the above mentioned reducing saccharides, non-reducing saccharides, cyclodextrins, spices and condiments, sours, flavor-enhancers, alcohols, water-soluble polysaccharides, and inorganic salts can be arbitrarily used in combination to impart the present agent a flavor-improving effect in addition to the trimethylamine formation inhibitory effect. If necessary, adequate amounts of conventional flavor-imparting agents, color-imparting agents, food preservatives, food stabilizers, etc., can be freely used in combination. The trimethylamine formation inhibitory agent thus obtained should not be restricted to a particular shape or form, and it can be those in the form of a syrup, powder, crystal, granule, and tablet. The agent can be used independently of its use as long as it can be used in edible parts of raw fishery products to exert a desired trimethylamine formation inhibitory effect. For example, such an agent can be used in accordance with the aforesaid method for incorporating trehalose and/or maltitol into edible parts of raw fishery products to inhibit the formation of trimethylamine from the edible parts; After incorporating the trimethylamine formation inhibitory agent into edible parts of raw fishery products, the resulting products are preserved and/or processed, and more concretely, the dose of trehalose and/or maltitol, as effective ingredients, to the edible parts and the preserving and/or processing conditions can be selected similarly as in the above, resulting in an exertion of satisfactory trimethylamine formation inhibitory effect on edible parts of fishery products and resulting in a readily production of edible fishery products with a satisfactory taste and flavor. The combination use of the present trimethylamine formation inhibitory agent and a seasoning(s) such as a soy sauce, miso, vinegar, sweetened sake, synthetic mirin, amino- or nucleic-seasoning, and salt can advantageously exert a desired trimethylamine formation inhibitory effect and provide flavorful daily dishes and foods served in pots.

As described above, the edible fishery products as referred to in the present invention are still be satisfactory edible fishery products having a desired trimethylamine formation inhibitory effect and edible products or compositions containing the same, all of which are flavorful and tasteful edible products, even after they are preserved under cooling or freezing conditions at about 5° C. or lower, or processed with treatments such as drying, soaking, grilling, boiling, steaming, and frying.

The following experiments describe the present invention in detail:

EXPERIMENT 1

Influence of Coexisting Saccharides on the Effect of Inhibiting Trimethylamine Formation from Trimethylamine Oxide Into 20-ml vials were placed two milliliters aliquots of 5% aqueous trimethylamine oxide containing 0–5% of either saccharides consisting of trehalose, maltitol, sucrose and maltose as testing saccharides, and 0.2M phosphate buffer (pH 7.0), and the vials were heated at 100° C. for three hours and cooled to ambient temperature. Trimethylamine in each solution was quantified by the Picrate method disclosed in Method for Food Analysis, edited by the editorial board of Food Analysis in Japanese Society for Food Science and Technology, Tsukuba, Japan, pp. 674–676 (1982).

The results are in Table 1.

TABLE 1

| Saccharide | Concentration of saccharide (%) | Concentration of trimethylamine Concentration (mg/ml) | Relative value |
|---|---|---|---|
| None | — | 7.10 | 100 |
| Trehalose | 1 | 4.63 | 65 |
| | 2 | 3.67 | 52 |
| | 5 | 2.55 | 36 |
| Maltitol | 1 | 6.14 | 86 |
| | 2 | 4.87 | 69 |
| | 5 | 2.93 | 41 |
| Sucrose | 1 | 6.64 | 94 |
| | 2 | 6.60 | 93 |
| | 5 | 6.43 | 91 |
| Maltose | 1 | 6.53 | 92 |
| | 2 | 6.39 | 90 |
| | 5 | 6.03 | 85 |

As evident from the results in Table 1, it was revealed that, as compared with the system with no saccharide, the system coexisted with trehalose or maltitol strongly inhibited the formation of trimethylamine from trimethylamine oxide. No substantial inhibitory effect was found in the system with sucrose or maltose.

EXPERIMENT 2

Influence of Coexisting Saccharides on the Effect of Inhibiting Trimethylamine Formation in Chub Mackerel's Meat Boiled in Water A chub mackerel's meat was minced with a mincer, and 10 g aliquots of the resulting mince were placed in 50-ml vials. To each vial was added five milliliters of a 5% aqueous saccharide solution, and the vials were sealed with a butyl rubber stopper, and heated for 15 min in a boiling water bath. Trehalose, maltitol, glucose, fructose, xylose, sorbitol, sucrose, maltose, and neotrehalose were used as saccharides. After cooled to ambient temperature, the vials were heated at 80° C. for five minutes in a preheated heat-block, followed by sampling two milliliters of head-space gas in each vial with a gas syringe for analyzing volatile components on gas chromatography (GLC). The apparatuses and conditions used in the GLC analysis were: "GC-14B", a GLC apparatus commercialized by Shimadzu Techno-Research, Inc., Kyoto, Japan; "CAPILLARY COLUMN TC-FFAP", a column for analysis having 0.53 mm in diameter, 30 m in length, and one micrometer thick, commercialized by GL Sciences Inc., Tokyo, Japan; a carrier gas, helium gas, at a flow rate of 10 ml/min; an injection temperature, 200° C.; a column oven temperature, successively set to 40° C. for five minutes and heated up to 200° C. at an increasing temperature rate of 5° C./min; and a hydrogen flame ionization detector as a detector. For the same samples, six veteran panels conducted the sensory evaluation.

The results are in Table 2.

TABLE 2

| Saccharide | pH of solution after boiled in water | Concentration of trimethylamine in gas phase | | Evaluation |
|---|---|---|---|---|
| | | ppt | Relative value | |
| None | 6.7 | 1180 | 100 | +++ |
| Trehalose | 6.7 | 778 | 66 | + |
| Maltitol | 6.7 | 578 | 49 | + |
| Glucose | 6.5 | 1160 | 98 | +++ |
| Fructose | 6.3 | 1200 | 102 | +++ |
| Xylose | 6.5 | 1240 | 105 | +++ |
| Sorbitol | 6.6 | 1130 | 96 | +++ |
| Sucrose | 6.6 | 1270 | 108 | +++ |
| Maltose | 6.5 | 991 | 84 | ++ |
| Neotrehalose | 6.7 | 1060 | 90 | +++ |

Note:
In the table, the sensory evaluation is evaluated based on the standard of "+++", "+" and "++" which represent a grade of at least four panelists who answered the level of unpleasant raw smell of a sample with saccharide was not lower than that of a control free of saccharide; a grade of at least four panelists who answered the level was relatively low among six panelists; and a grade of between the above two grades, respectively. The symbol "ppt" means "parts by trillion $(1/10^{12})$".

As evident from the results in Table 2, it was revealed that, as compared with the system with no saccharide, trimethylamine formation was strongly inhibited in the system coexisted with trehalose and/or maltitol during boiling in water, resulting in an effective inhibition of the raw smell of chub mackerel's meat. No trimethylamine-formation-inhibitory action was found in the system with glucose, fructose, xylose, sorbitol, sucrose, and neotrehalose. The system with maltose only showed a slight inhibitory action.

EXPERIMENT 3

Influence of the Difference of Timing for Coexisting Trehalose and/or Maltitol on the Action of Inhibiting Trimethylamine Formation from Chub Mackerel's Meat During or after boiling in water, trehalose and/or maltitol were added to chub mackerel's meat, then the systems were compared with respect to the amount of trimethylamine present in the volatile components formed in each system. Ten grams of a mince of chub mackerel's meat was placed in a 50-ml vial and mixed with five milliliters of a 5% solution of trehalose or maltitol corresponding to 2.5% to the mince by weight, followed by sealing the vial with a butyl rubber stopper and incubating the vial in boiling water for 15 min. In the case of incorporating both trehalose and maltitol to chub mackerel's meat, the meat was treated similarly as above using 2.5 ml aliquots of each 5% solutions of trehalose and maltitol. The systems with such treatments were regarded as systems for coexisting saccharides during boiling in water. As a control, a system with an equal amount of water substituted for the saccharide solutions was used. Apart from these systems, 10 g of a mince of chub mackerel's meat was placed in a 50-ml vial and admixed with five milliliters of water, followed by sealing the vial with a butyl rubber stopper, incubating the vial in boiling water for 15 min, and cooling the vial to ambient temperature. To the resulting mixture was added 0.25 g of crystal of trehalose or maltitol, d.s.b., corresponding to five milliliters of a 5% aqueous solution of each saccharide, followed by dissolving the crystal, and sealing again the vial with a butyl rubber stopper, and incubating the vial at 80° C. for 30 min. When coexisting both trehalose and maltitol, 0.125 g, d.s.b., aliquots of each saccharide were used and treated similarly as above. The systems treated with such treatments were regarded as systems coexisted with saccharides after boiling in water. As a control, a system with no saccharide crystal was used. Head-space gases in each vial were analyzed on GLC similarly as in Experiment 2.

The results are in Table 3.

TABLE 3

| Testing system | Saccharide | pH of solution after boiled in water | Concentration of trimethylamine in gas phase (relative value) |
|---|---|---|---|
| System coexisted with saccharide during boiling in water | None | 6.6 | 100 |
| | Trehalose | 6.5 | 64 |
| | Maltitol | 6.5 | 50 |
| | Trehalose + Maltitol | 6.5 | 56 |
| System coexisted with saccharide after boiled in water | None | 6.6 | 100 |
| | Trehalose | 6.6 | 96 |
| | Maltitol | 6.5 | 95 |
| | Trehalose + Maltitol | 6.5 | 96 |

As evident from the results in Table 3, trimethylamine formation was strongly inhibited similarly as in Experiment 2 in the systems coexisted with saccharides during boiling in water as compared with the control system with no saccharide, independently of the presence of trehalose and/or maltitol. The systems coexisted with saccharides after boiling in water showed a lower trimethylamine-formation-inhibitory-effect than the control system with no saccharide. It can be estimated that trehalose and/or maltitol inhibit trimethylamine formation during heating of raw chub mackerel's meat to lower the formation of unpleasant raw-smell inherent to fish. Considering systematically the results in Experiments 1 to 3, unlike the inclusion action on fish smell by cyclodextrins, it can be concluded that the action of inhibiting the raw-fish-smell by coexisting trehalose and/or maltitol during boiling raw-fish-meat in water positively inhibits trimethylamine formation per se from trimethylamine oxide contained in fish meat. As a timing for coexisting trehalose and/or maltitol, it is important to coexist these saccharides in edible parts of fishery products when trimethylamine is to be formed. In other words, it can be speculated that in the case of coexisting the above saccharides in a system containing trimethylamine once-formed, only expected is a partial masking effect.

EXPERIMENT 4

Influence of Saccharides on the Effect of Inhibiting the Formation of Trimethylamine and Methyl Mercaptan from Chub Mackerel's Meat A chub mackerel's meat was minced with a mincer, and 10 g aliquots of the resulting mince were placed in 50-ml vials. To each vial were added five milliliters of five percent aqueous trehalose solutions containing 0.5, 1 and 2 g hydrous crystalline trehalose corresponding to 5%, 10% and 20% to the mice by weight, respectively, and the vials were sealed with a butyl rubber stopper, and heated for 15 min in a boiling water bath. After cooled to ambient temperature, the vials were heated at 80° C. for five minutes in a preheated heat-block, followed by sampling the head-space gas in each vial with a gas syringe for analyzing trimethylamine and ethyl mercaptan on GLC. For trimethylamine and ethyl mercaptan analyses, one milliliter of the sampled head-space gas was analyzed on GLC similarly as in Experiment 2. While five milliliters of the sampled head-space gas was injected to "GASTEC NO.72L", a glass-detection tube for ingredient analysis, commercialized by GL Science, Tokyo, Japan, for measuring the concentration of ethyl mercaptan. As controls, there provided and tested similarly as above using a system with no saccharide and another system with 10% or 20% anhydrous crystalline sorbitol, as a comparative saccharide, with respect to the mince by weight.

The results are in Table 4.

TABLE 4

| Saccharide | Concentration of volatile ingredient in gas-phase (ppt) | |
| --- | --- | --- |
| | Trimethylamine | Ethyl mercaptan |
| None | 2,180 | 26,250 |
| Trehalose | | |
| 5% | 1,230 | 10,500 |
| 10% | 395 | 9,750 |
| 20% | 160 | 7,750 |
| Sorbitol | | |
| 10% | 1,900 | 28,250 |
| 20% | 1,420 | 20,000 |

Note:
In table, the symbol "ppt" means "parts by trillion $(1/10^{12})$".

As evident from the results in Table 4, the coexistence of trehalose inhibits the formation of trimethylamine, a specific smell of raw fishery products, and also inhibits the formation of ethyl mercaptan. It was proved that the effects by trehalose were increased positively depending on the amount of the trehalose added.

The following Examples A and B describe in detail the agent for inhibiting trimethylamine formation and the edible fishery product according to the present invention:

EXAMPLE A-1

Trimethylamine Formation Inhibitory Agent

An about 40% solution was prepared by adding water to "MALSTAR®", a high maltose content syrup commercialized by Hayashibara Shoji, Inc., Okayama, Japan, inoculated with two units per gram maltose of a maltose/trehalose converting enzyme as disclosed in Japanese Patent Kokai No. 170,977/95, and enzymatically reacted at 35° C. and pH 7.0 for 16 hours. Thereafter, the reaction mixture was in conventional manner heated to inactivate the remaining enzyme, decolored, purified, and concentrated into a syrupy product having a moisture content of about 30% and DE (dextrose equivalent) 42, and containing about 20% trehalose, d.s.b., and reducing saccharides including glucose, maltose, etc. The product is stable at ambient temperature and easily handleable and can be arbitrarily used as a syrupy trimethylamine formation inhibitory agent for preserving edible raw-fishery-products and/or for processing materials.

EXAMPLE A-2

Trimethylamine Formation Inhibitory Agent

An about 30% starch suspension was prepared with corn starch and contacted with a-amylase to obtain a liquefied solution having DE 15 which was then inoculated with five units per gram starch of a non-reducing saccharide-forming enzyme disclosed in Japanese Patent Kokai No. 213,283/95, 10 units per gram starch of a trehalose-releasing enzyme, and 50 units per gram starch of isoamylase, enzymatically reacted at pH 6.0 and 40° C. for 24 hours, further inoculated with 10 units per gram starch of β-amylase, and enzymatically reacted for 10 hours. The reaction mixture was heated to inactivate the remaining enzyme, and in conventional manner decolored, desalted, purified, and concentrated into a syrupy product having a moisture content of about 30% and a DE of about 38 and containing about 22% trehalose together with reducing saccharides such as glucose, maltose, and maltotriose. The product is relatively stable at ambient temperature and easily handleable, and it can be arbitrarily used as a syrupy trimethylamine-formation-inhibitory agent for preserving edible parts of raw fishery products and/or for processing materials.

EXAMPLE A-3

Trimethylamine Formation Inhibitory Agent

A syrupy product obtained by the method in Example A-2 was placed in an autoclave and admixed with 10% Raney nickel catalyst, followed by increasing the inner temperature to 90–120° C. under stirring conditions and increasing the inner hydrogen pressure to 20–120 kg/cm$^2$ to terminate the hydrogenation. Thereafter, the Raney nickel catalyst was removed from the reaction mixture, and the resulting mixture was in conventional manner decolored, desalted, purified, and concentrated into a syrupy product having a moisture content of about 30%, DE of less than 1.0, and about 21% trehalose together with non-reducing saccharides such as sorbitol, maltitol, and maltotriitol. The product, having an insubstantial reducibility, extremely-high stability, and ease handleability, can be arbitrarily used as a syrupy trimethylamine-formation-inhibitory agent for preserving edible parts of raw fishery products and/or for processing materials.

EXAMPLE A-4

Trimethylamine Formation Inhibitory Agent

In 100 parts by weight of water were dissolved by mixing 20 parts by weight of "TREHAOSE®", a hydrous crystalline trehalose commercialized by Hayashibara Shoji, Inc., Okayama, Japan, 10 parts by weight of sorbitol, 0.1 part by weight of calcium chloride, and 0.2 part by weight of citric acid. The resulting solution was placed in a container, sterilized by heating, and cooled to obtain a syrupy product. The product can be arbitrarily used as a syrupy trimethylamine-formation-inhibitory agent for preserving edible parts of raw fishery products and/or for processing materials.

EXAMPLE A-5

Trimethylamine Formation Inhibitory Agent

Fifty parts by weight of anhydrous crystalline trehalose commercialized by Hayashibara Shoji, Inc., Okayama, Japan, and 50 parts by weight of salt were mixed to homogeneity to obtain a powdery product. The product can be arbitrarily used as a syrupy trimethylamine-formation-inhibitory agent for preserving edible parts of raw fishery products and/or for processing materials, specifically materials for salt preservation with lesser salt.

EXAMPLE A-6

Trimethylamine Formation Inhibitory Agent

Twenty parts by weight of "TREHAOSE®", a hydrous crystalline trehalose commercialized by Hayashibara Shoji, Inc., Okayama, Japan, two parts by weight of "DEXY PEARL®", a β-cyclodextrin powder commercialized by Hayashibara Shoji, Inc., Okayama, Japan, and one part by weight of pullulan were mixed to homogeneity. Then the resulting mixture was in conventional manner granulated by a granulator into granules. The product can be arbitrarily used as a syrupy trimethylamine-formation-inhibitory agent for preserving edible parts of raw fishery products and/or for processing materials.

EXAMPLE A-7

Trimethylamine Formation Inhibitory Agent

Twenty-five parts by weight of "TREHAOSE®", a hydrous crystalline trehalose commercialized by Hayashibara Shoji, Inc., Okayama, Japan, 25 parts by weight of "MABIT®", an anhydrous crystalline maltitol commercialized by Hayashibara Shoji, Inc., Okayama, Japan, one part by weight of pullulan, 0.1 part by weight of tartaric acid, and 0.1 part by weight of malic acid were mixed to homogeneity. The resulting mixture was in conventional manner tabletted by a tabletting machine into tablets, 8 mm in diameter and 4.5 mm in thickness each. The product can be arbitrarily used as a syrupy trimethylamine-formation-inhibitory agent for preserving edible parts of raw fishery products and/or for processing materials, especially used for cooking edible parts of raw fishery products into daily dishes, nabemono (a food cooked in a pot or pan), etc.

EXAMPLE B-1

Processed Spawns

A syrupy trimethylamine-formation-inhibitory agent, obtained by the method in Example A-4, was placed in a container and diluted five-times with water. Fresh herring roes were placed in a bamboo basket and soaked in the above dilute. One hour after the soaking, the basket was taken out from the dilute for draining water to obtain the desired product. The product has properties of well-inhibiting trimethylamine formation, scarcely changing under cold storage, forming less drip when thawed after cold storage, and well-keeping the original freshness during and after cold storage. Even after cooking of the product in usual manner, it had a lesser smell of trimethylamine and ethyl mercaptan, and had a satisfactory flavor, taste, and feeling.

EXAMPLE B-2

Dried Fish

One hundred parts by weight of a fillet of raw puffer was seasoned with a small amount of salt by homogeneously spraying over three parts by weight of a trimethylamine formation inhibitory agent containing salt obtained by the method in Example A-5, and rolled to extend plainly into a sheet with an about eight millimeters thick. The sheet was soaked for 30 min in 200 parts by weight of a syrupy trimethylamine-formation-inhibitory agent obtained by the method in Example A-4, drained, and dried overnight into the desired product. The trimethylamine formation of the product was well inhibited, and the original freshness was satisfactorily retained. Even after toasted over a slow fire in usual manner, the product had a lesser smell of trimethylamine and ethyl mercaptan, and had a satisfactory flavor, taste, and feeling.

EXAMPLE B-3

Dried Small Sardine

One hundred parts by weight of water was boiled in a caldron, then two parts by weight of a granule trimethylamine-formation-inhibitory agent obtained by the method in Example A-6 was dissolved therein, and the solution was boiled up, followed by soaking and boiling up therein 10 parts by weight of a raw Japanese anchovy placed in a bamboo basket. Thereafter, the boiled Japanese anchovy was taken out from the basket and dried in conventional manner to obtain the desired product. The trimethylamine formation of the product was effectively inhibited, and the original freshness was satisfactorily retained while having a satisfactory color, flavor, and taste.

EXAMPLE B-4

Dried Small Sardine

A Japanese anchovy, which had been boiled up by the method in Example B-3 and placed in a bamboo basket, was soaked for five minutes in a caldron with a boiling solution dissolving in 100 parts by weight of water 60 parts by weight of "TREHAOSE®", a hydrous crystalline trehalose commercialized by Hayashibara Shoji, Inc., Okayama, Japan. Thereafter, the boiled Japanese anchovy was taken out from the basket and dried in conventional manner into the desired product with crystallized hydrous trehalose crystal. The trimethylamine formation of the product was effectively inhibited, and the product can be easily used for preparing a stock with a satisfactory color tint, flavor, and taste. The product, having a lesser hygroscopicity, higher stability, and satisfactory sweetness, can be arbitrarily used as a delicacy, snuck food, confectionery-type food, health food, etc.

EXAMPLE B-5

Shucked Short-Necked Clam

After boiling 100 parts by weight of water in a caldron, it was mixed with three parts by weight of a syrupy trimethylamine inhibitory agent obtained by the method in Example A-3, then boiled up. In the resulting solution was soaked and boiled up 10 parts by weight of short-necked clams after placed in a bamboo basket. The clams were taken out in conventional manner to obtain shucked short-necked clams boiled in water. The trimethylamine formation of the product was well inhibited and had a satisfactory color, gloss, flavor, and taste. The product can be arbitrarily processed into a food boiled down in soy and used as a material for seasoning for a seafood curry and a boiled rice mixed with fish and vegetables.

EXAMPLE B-6

Boiled Octopus

Ten parts by weight of raw octopus was seasoned with salt using a trimethylamine formation inhibitory agent containing salt obtained by the method in Example A-5, and the resulting octopus was placed for boiling up in a caldron, which contained 100 parts by weight of boiling water dissolving three parts by weight of a trimethylamine formation inhibitory agent obtained by the method in Example A-7, to obtain the desired product. The trimethylamine formation of the product was effectively inhibited. The product had a satisfactory color, gloss, flavor, and taste, and it can be cut into slices in an appropriate size for use as a material of sushi, and arbitrarily used in daily dishes such as foods seasoned with vinegar and Japanese hotchpotch.

EXAMPLE B-7

Pacific Herring Seasoned With Vinegar

A fillet of raw Pacific herring was slightly seasoned with a trimethylamine formation inhibitory agent obtained by the method in Example A-5, and after one-hour standing, the seasoned fillet was soaked for five hours at ambient temperature in a seasoning, prepared by dissolving in 100 parts by weight of vinegar five parts by weight of a trimethylamine formation inhibitory agent obtained by the method in Example A-1 and one part by weight of a broth of tangle. The trimethylamine formation of the product was effectively inhibited. The product had a satisfactory color, gloss, flavor, and taste, and it can be cut into slices with an appropriate size for use as a material of sushi and arbitrarily used in daily dishes including foods seasoned with vinegar.

EXAMPLE B-8

Yellowtail Boiled Hard With Soy

One hundred parts by weight of slices of fresh raw yellowtail was placed in a pan and boiled in usual manner after mixed with 10 parts by weight of a trimethylamine formation inhibitory agent obtained by the method in Example A-2, 10 parts by weight of soy, five parts by weight of a sweet sake, and 10 parts by weight of water. The trimethylamine formation of the product was effectively inhibited, and the product had a satisfactory color, gloss, flavor, and taste.

EXAMPLE B-9

Fish Paste

Four thousand parts by weight of a thawed paste of Alaska pollock was pasted after mixing with 100 parts by weight of an aqueous solution which had been prepared by dissolving in water 80 parts by weight of a trimethylamine inhibitory agent obtained by the method in Example A-6, 80 parts by weight of sodium glutamate, 200 parts by weight of potato starch, 300 parts by weight of ice water, 12 parts by weight of sodium tripolyphosphate, 120 parts by weight of salt, and 10 parts by weight of sorbitol. One hundred and twenty grams aliquots of the resulting paste were shaped and attached on wooden plates. The plates with paste were heated by steaming and steamed up until the inner temperature of the paste increased to a temperature of about 80° C. in 30 min. Thereafter, the plates were cooled at ambient temperature and allowed to stand at 4° C. for 24 hours to obtain the desired product. The trimethylamine formation of the product was effectively inhibited, and the product had a satisfactory flavor and taste, fine surface, smooth gloss, and mouth feel.

EXAMPLE B-10

Fry-Like Food of Sprat

One part by weight of raw sprats, which had been removed their guts and slightly seasoned with salt, was placed in a boiling syrup (107° C.) having a concentration of about 75% and dissolving 20 parts by weight of "TREHAOSE®", a hydrous crystalline trehalose commercialized by Hayashibara Shoji, Inc., Okayama, Japan, in five parts by weight of water, and continued boiling to concentrate for about 40 min until brought up to a temperature of about 114° C. to attain a dehydration treatment by heating as used for frying. The resulting fry was placed in a bamboo basket, dried by air heated to 50° C. for five hours to obtain a fry-like food of sprats adhered with hydrous crystalline trehalose on its surface. The trimethylamine formation of the product was effectively inhibited, and the product was satisfactory in flavor and taste and used in daily dishes, foods of delicate flavor, snack foods, etc.

EXAMPLE B-11

Fry-Like Food of Shrimp

One part by weight of raw shrimps, which had been removed their tests and sprayed with an adequate amount of a curry mix, was placed in a boiling syrup (about 110° C.) having a concentration of about 80% prepared by dissolving 40 parts by weight of "TREHAOSE®", a hydrous crystalline trehalose commercialized by Hayashibara Shoji, Inc., Okayama, Japan, in 10 parts by weight of water, and continued boiling to concentrate for about five minutes until brought up to a temperature of about 114° C. to attain a dehydration treatment by heating as used for frying. The resulting fry was placed in a bamboo basket, dried by air heated to 35° C. overnight to obtain a fry-like food of shrimps adhered with hydrous crystalline trehalose on its surface. The trimethylamine formation of the product was effectively inhibited, and the product was satisfactory in flavor and taste and used in daily dishes, foods of delicate flavor, snack foods, etc.

Effect of the Invention

As described above, completely differing from prior arts, the present invention is to provide a method for inhibiting trimethylamine formation per se from edible parts of raw fishery products by incorporating trehalose and/or maltitol, an edible fishery product with a satisfactory flavor and taste obtained by the method, and a trimethylamine formation inhibitory agent having trehalose and/or maltitol as effective ingredients, as well as uses thereof. The present invention has the following features: Since the trehalose and/or maltitol used as effective ingredients in the present invention are stable non-reducing saccharides, nutritional ingredients such as vitamins, amino acids, peptides, etc., which are present in raw edible parts of fishery products, are less decomposed during their storage and/or processings. In addition, the edible parts of fishery products thus obtained have a satisfactory flavor and taste and a relatively-high nutritive value. Thus the establishment of the present invention has a great significance in the particular fields of aquatic products, health foods, and restaurants dealing with sea foods.

While there has been described what is at present considered to be the preferred embodiments of the invention, it will be understood the various modifications may be made therein, and it is intended to cover in the appended claims all such modifications as fall within the true spirits and scope of the invention.

We claim:

1. A method for inhibiting trimethylamine and ethyl mercaptan formation, which consists essentially of:

soaking or boiling an edible part of a raw fishery product which has not been minced or ground, which is in need of trimethylamine and ethyl mercaptan formation inhibition, in a solution consisting essentially of either (1) trehalose or (2) trehalose and maltitol, to incorporate at least 0.1 w/w % of (1) said trehalose or (2) said trehalose and said maltitol in total, on a dry solid basis, into said edible part of raw fishery product to inhibit the trimethylamine and ethyl mercaptan formation in the edible part of said raw fishery product.

2. The method of claim 1, which is for inhibiting trimethylamine formation from trimethylamine oxide.

3. In a method of preserving and/or processing an edible part of a raw fishery product, the improvement comprising carrying out said preserving and/or processing in the presence of at least 0.1 w/w % of trehalose and maltitol in total and an organic acid selected from the group consisting of acetic acid, lactic acid, citric acid, tartaric acid, malic acid, and gluconic acid together with trehalose and maltitol to neutralize or acidify said edible part of said raw fishery product, on a dry solid basis, on said edible part of said raw fresh fishery product, thereby inhibiting trimethylamine and ethyl mercaptan formation.

4. The method of claim 3, wherein said processing is conducted by one or more methods selected from the group consisting of drying, soaking, grilling, boiling, steaming, and frying.

5. The method of claim 3, which further comprises a step of incorporating an agent for inhibiting formation of trimethyl amine and ethyl mercaptan, said agent containing at least 10 wt % of trehalose and maltitol.

6. A method for inhibiting trimethylamine and ethyl mercaptan formation, which comprises:

soaking or boiling an edible part of a fishery product which has not been minced or ground, which is in need of trimethylamine and ethyl mercaptan formation inhibition, in a solution consisting essentially of either (1) trehalose or (2) trehalose and maltitol to incorporate into said edible part of said raw fishery product to be treated, a trimethylamine and ethyl mercaptan formation inhibitory agent, which consists essentially of either (1) trehalose or (2) trehalose and maltitol as an effective ingredient in an amount of at least about 10 w/w % of (1) said trehalose or (2) said trehalose and said maltitol in total, on a dry solid basis, in an amount of said agent sufficient to inhibit formation of trimethylamine and ethyl mercaptan, whereby said edible part of said fishery product does not have a characteristic unpleasant fish smell.

* * * * *